United States Patent
Wu et al.

(10) Patent No.: US 10,206,115 B2
(45) Date of Patent: Feb. 12, 2019

(54) WI-FI VIRTUALIZED NETWORK OPERATOR

(71) Applicant: AT&T INTELLECTUAL PROPERTY I, L.P., Atlanta, GA (US)

(72) Inventors: Michael Wu, Dublin, CA (US); Barrett M. Kreiner, Woodstock, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 99 days.

(21) Appl. No.: 15/169,692

(22) Filed: May 31, 2016

(65) Prior Publication Data
US 2017/0347269 A1 Nov. 30, 2017

(51) Int. Cl.
| H04W 16/14 | (2009.01) |
| H04W 12/08 | (2009.01) |
| H04W 48/08 | (2009.01) |
| H04W 76/40 | (2018.01) |
| H04W 84/12 | (2009.01) |

(52) U.S. Cl.
CPC ........... *H04W 16/14* (2013.01); *H04W 12/08* (2013.01); *H04W 48/08* (2013.01); *H04W 76/40* (2018.02); *H04W 84/12* (2013.01)

(58) Field of Classification Search
CPC . H04W 16/14; H04W 12/08; H04W 72/0453; H04W 72/0426; H04W 76/002; H04W 84/12
See application file for complete search history.

(56) References Cited

U.S. PATENT DOCUMENTS

| 7,580,701 B2 | 8/2009 | Ross et al. |
| 7,647,048 B2 | 1/2010 | Brok et al. |
| 7,924,793 B2 | 4/2011 | Savoor et al. |
| 8,077,689 B1 | 12/2011 | Jones et al. |
| (Continued) | | |

FOREIGN PATENT DOCUMENTS

| EP | 1876761 B1 | 8/2010 |
| GB | 2473825 A | 3/2011 |
| WO | 2013183931 A1 | 12/2013 |

OTHER PUBLICATIONS

Cunche, et al., "Linking Wireless Devices Using Information Contained in Wi-Fi Probe Requests," Pervasive and Mobile Computing, 2013, 27 pages, Version 1, Retrieved on Sep. 6, 2014.
(Continued)

*Primary Examiner* — Raj Jain
*Assistant Examiner* — Harry H Kim
(74) *Attorney, Agent, or Firm* — Amin, Turocy & Watson, LLP

(57) ABSTRACT

A Wi-Fi virtualized network operator (WVNO) function can be created by offering resources of a wireless access point (AP), for example, a Wi-Fi access point, to one or more third party service providers. In one aspect, the AP can broadcast two or more service set identifiers (SSIDs) that are linked to respective service provider over the same frequencies. End user devices (EUDs) located within the coverage area of the AP can select a SSID corresponding to a preferred network and connect to the preferred network via the access point. A routing device can be employed to direct traffic to/from the EUDs and a device of an appropriate network based on the SSID that has been selected.

20 Claims, 10 Drawing Sheets

(56) References Cited

U.S. PATENT DOCUMENTS

| | | | |
|---|---|---|---|
| 8,131,303 B2 | 3/2012 | Cook et al. | |
| 8,165,101 B2 | 4/2012 | Abhishek et al. | |
| 8,553,662 B2 | 10/2013 | Chen et al. | |
| 8,619,729 B2 | 12/2013 | Alper et al. | |
| 8,750,265 B2 | 6/2014 | Scherzer et al. | |
| 8,782,172 B2 | 7/2014 | Kim et al. | |
| 8,799,476 B2 | 8/2014 | Karaoguz et al. | |
| 9,100,381 B2 | 8/2015 | Cai et al. | |
| 9,125,170 B2 | 9/2015 | Varsavsky Waisman-Diamond | |
| 2002/0059434 A1 | 5/2002 | Karaoguz et al. | |
| 2004/0073784 A1 | 4/2004 | Ishidoshiro | |
| 2007/0082654 A1 | 4/2007 | Hovnanian et al. | |
| 2009/0129301 A1 | 5/2009 | Belimpasakis | |
| 2009/0161683 A1* | 6/2009 | Allie | H04L 12/46 370/401 |
| 2010/0309815 A1 | 12/2010 | Yepez et al. | |
| 2011/0013608 A1* | 1/2011 | Lee | H04W 72/04 370/338 |
| 2011/0296501 A1 | 12/2011 | Drovdahl et al. | |
| 2013/0208693 A1 | 8/2013 | De La Forest Divonne et al. | |
| 2013/0263217 A1 | 10/2013 | Avital | |
| 2013/0308565 A1* | 11/2013 | Riegel | H04W 76/15 370/329 |
| 2013/0308622 A1 | 11/2013 | Uhlik | |
| 2013/0340013 A1 | 12/2013 | Chadha | |
| 2014/0029750 A1 | 1/2014 | Wei et al. | |
| 2014/0064257 A1* | 3/2014 | Fontaine | H04W 72/0446 370/336 |
| 2014/0185599 A1 | 7/2014 | Vatanapanpilas et al. | |
| 2015/0172957 A1 | 6/2015 | Sarawat et al. | |
| 2015/0195760 A1 | 7/2015 | Sanz et al. | |

OTHER PUBLICATIONS

"Wi-Fi Certified Passpoint Architecture for Public Access." Aruba White Paper, 2011, 15 pages, Aruba Networks, Retrieved on Sep. 6, 2014.

Office Action for U.S. Appl. No. 14/547,969 dated Jul. 26, 2016, 28 pages.

Office Action for U.S. Appl. No. 14/547,969 dated Jan. 25, 2017, 27 pages.

Office Action for U.S. Appl. No. 14/547,969 dated Oct. 2, 2017, 26 pages.

* cited by examiner

WI-FI VIRTUALIZED NETWORK OPERATOR

TECHNICAL FIELD

The subject disclosure relates to wireless communications, e.g., a Wi-Fi virtualized network operator.

BACKGROUND

In modern day society, user connectivity to selected wireless networks is desirable. Wireless networks are preferred over wired networks due to the reduction in complexity resultant from interacting with familiar computing and device environments. The value of providing wireless services to the user is generally recognized as a desirable service that businesses, institutions, and public venues can offer. However, conventional solutions for providing access to various networks are sub-optimal, and competing solutions can result in a bad end-user experience, which is associated with the location or business that may not be directly responsible.

Wi-Fi service was initially designed to have one or a few access points active within a defined area to provide end user network access. Wi-Fi utilizes unlicensed radio spectrum in the 2.4 Gigahertz (GHz), 5 GHz, and occasionally the 900 Megahertz (MHz) range, similar to cellular and/or personal communications services (PCS) radio network bands. Competing cellular radio networks do not generally interfere with each other because the spectrum they use is under exclusive license from the Federal Communications Commission (FCC). However, since Wi-Fi radio spectrum is unlicensed, multiple and sometimes competing companies can and do establish multi-access point networks which re-use the same frequencies, causing Wi-Fi interference. Additionally, Wi Fi interference can be caused by other non Wi-Fi devices (e.g. cordless phones, microwaves, etc). These other sources of interference also make the conventional state of infrastructure deployment sub-optimal.

Further, each company has to build and deploy the infrastructure (e.g., physical connectivity to a network, aka backhaul, access points, etc.) within the defined area. The deployment and maintenance costs associated with the infrastructure can be significant. Further, installation of the infrastructure can be a time consuming process. Maintenance is more extensive with Wi-Fi networks as the performance can further degrade after initial installation with the subsequent installations of additional Wi-Fi access points within the area.

DETAILED DESCRIPTION

Figure 1:
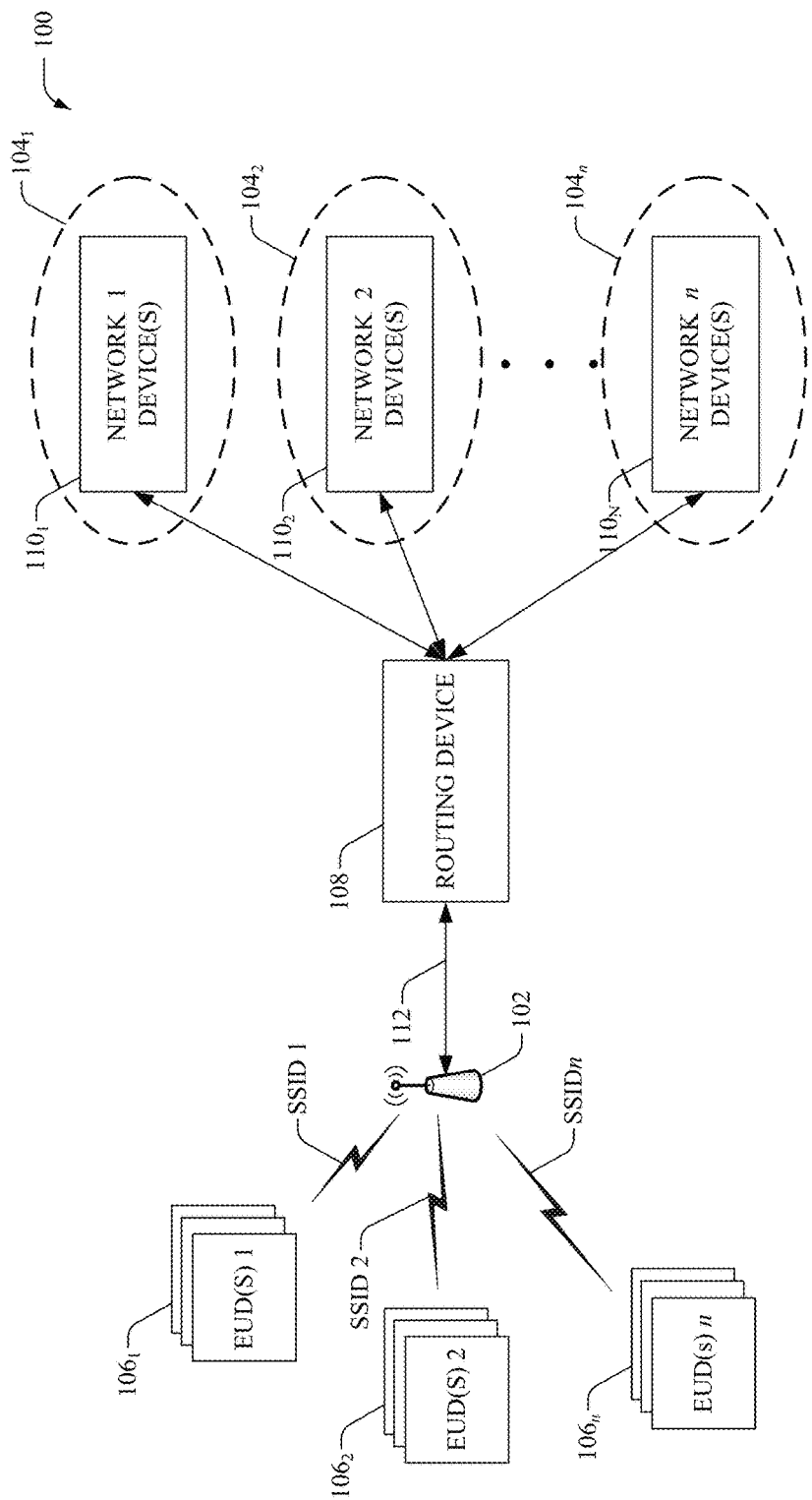
FIG. 1 illustrates an example system that that facilitates creating a Wi-Fi virtualized network operator (WVNO) function.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive, electrically erasable programmable read-only memory (EEPROM), etc.). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "end user device," "communication device," "mobile device," "user equipment," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Users of Wi-Fi/hot spot services typically desire an ability to connect to a subscribed and/or preferred Wi-Fi network. The preferred network is designated by a service set identifier (SSID), which the end user's device (EUD) can manually or automatically connect to. In dense urban environments, multiple personal and pubic Wi-Fi access points (APs) can be deployed within close proximity to each other. If multiple APs offer the same SSID, the EUD will try to connect to the AP offering the strongest signal. If there is no strong signal for the most preferred network, then the EUD may search for less preferred networks, potentially utilizing public networks as a last resort. In addition, the multiple Wi-Fi APs associated with different communication networks (e.g., deployed by different service providers) can have overlapping channels areas that can create significant interference and degrade performance. For example, the US standard Wi-Fi 2.4 Gigahertz (GHz) band defines 11 channels of 20 Megahertz (MHz) each, however they overlap each other in such a way that only 1, 6, and 11 can be used concurrently in a given location without causing interference. If the APs are utilizing 40 MHz channels, then only two channels, 3 and 11, can be used without interference. As more providers and/or end users establish Wi-Fi networks, the interference creates an unacceptable performance issue for the EUD.

The systems and methods disclosed herein facilitate creation of a Wi-Fi virtualized network operator (WVNO) function on an existing communication network. In one aspect, the WVNO function can be created by simultaneously (or substantially simultaneously) broadcasting two or more service set identifiers (SSIDs) that are linked to respective networks, via a common wireless AP (e.g., Wi-Fi AP), on the same frequencies. The data and security ascribed to each SSID is partitioned at the AP such that they are isolated from each other and do not present a cross-network security risk.

Embodiments described herein comprise systems, methods, apparatus and/or computer-readable storage media facilitating secure access to create WVNO function that are utilized to share AP resources between different service and/or network providers. In one embodiment, a method comprises facilitating, by an AP device that comprises a processor, a transmission of identifier data comprising first identifier data and second identifier data over common set of frequencies, wherein the first identifier data is indicative of a first network associated with a network provider that deploys the AP device and the second identifier data is indicative of a third party service provider. Further, the method comprises facilitating, by the AP device, a first routing of first communication data to a first network device of the first network, wherein the first communication data is received from a first end user device that selects the first identifier data during a first coupling of the first end user device and the AP device. Furthermore, the method comprises facilitating, by the AP device, a second routing of second communication data to a second network device of the second network, wherein the second communication data is received from a second end user device that selects the second identifier data during a second coupling of the second end user device and the AP device.

Another embodiment comprises an AP device comprising processor; and a memory that stores executable instructions that, when executed by the processor, facilitate performance of operations. The operations comprise broadcasting, via the same frequencies, identifier data comprising a first identifier of a communication network that deploys the AP device and a second identifier of a third party service provider. The operations further comprise subsequent to receiving first communication data from a first end user device that has coupled with the AP device by employing the first identifier, directing the first communication data to a routing device that is employable to route the first communication data to a first network device of the first network and subsequent to receiving second communication data from a second end user device that has coupled with the AP device by employing the second identifier, directing the second communication data to the routing device that is employable to route the second communication data to a second network device of the second network.

In another embodiment, machine-readable storage medium, comprising executable instructions that, when executed by a processor of an AP device deployed by a network provider, facilitate performance of operations. The operations comprise facilitating a transmission of identifier data comprising a first identifier assigned to a first network associated with the network provider and a second identifier assigned to a second network deployed by a third party service provider, wherein the facilitating comprises facilitating the transmission via shared frequencies. Further, the operations comprise receiving first communication data from a first end user device that employs the first identifier for coupling to the AP device and second communication data from a second end user device that employs the second identifier for coupling to the AP device. Furthermore, the operations comprise based on the first identifier, facilitating a first routing of the first communication data to a first network device of the first network and based on the second identifier, facilitating a second routing of the second communication data to a second network device of the second network.

Referring initially to FIG. 1, there illustrated is an example system 100 that facilitates creating a WVNO function, according to one or more aspects of the disclosed subject matter. As an example, system 100 can comprise a wireless AP 102, such as, but not limited to a Wi-Fi AP. Wi-Fi or Wireless Fidelity networks utilize radio technologies called IEEE 802.11 (a, b, g, n, ac, etc.) to provide secure, reliable, fast wireless connectivity. A Wi-Fi network can be used to connect devices to each other, to the Internet, and/or to wired networks (e.g., that use IEEE 802.3 or Ethernet). Typically, Wi-Fi networks operate in the unlicensed 2.4 and 5 GHz radio bands, rates for the standards include 802.11b (11 Mbs), 802.11a, 802.11b (54 Mbs) 802.11n (300-600 Mbs) and 802.11ac (up to 1.3 Gbs) so the networks can provide real-world performance similar to 1 Gbs Ethernet.

Oftentimes, a large number of public and/or private Wi-Fi APs associated with different service/network providers can be deployed within urban areas (e.g., a mall, an apartment complex, an event venue, etc.). Since these Wi-Fi APs typically operate individually over unlicensed frequencies and do not communicate with each other, interference caused by signal transmissions of neighboring Wi-Fi APs can be significantly high and can lead to degraded performance and/or poor customer satisfaction. In addition, when a EUD is located within coverage areas of these Wi-Fi APs, selection of a preferred network can oftentimes be challenging. Typically, the EUD will automatically connect to the Wi-Fi AP providing the most preferred network that provides the strongest signal. However, a user may prefer to connect to another network to leverage services offered and/or lower billing rates. To overcome at least the above mentioned problems, system 100 can be deployed, wherein a WVNO function can be created by employing a shared wireless AP 102 for multiple networks.

In one aspect, the wireless AP 102 can be configured to simultaneously (or substantially simultaneously) broadcast multiple identifier signals, such as, but not limited to, service set identifiers (SSIDs) over the same frequencies. For example, SSID1, SSID2, SSID3, SSIDn (wherein n is a positive integer greater than 1) can be assigned to respective networks $104_1$, $104_2$, $104_3$, $104n$. A SSID can be a unique identifier utilized to establish and maintain wireless connectivity. Typically, multiple APs on a network or sub-network can utilize the same SSIDs. As an example, the SSIDs can comprise identifiers that are up to 32 characters utilizing UTF-8 encoding; however for ease of use are normally limited to Latin-1 (ASCII printable) characters. In one aspect, SSIDs can comprise a word or phrase associated with a private or public network (e.g. a service provider). According to an aspect, based on configuration instructions, for example, received from a provisioning server, the wireless AP 102 can assign different configuration settings to each SSID, such as, but not limited to, virtual local area network (VLAN), EUD authentication method, a maximum number of EUD associations using the SSID, accounting for traffic using the SSID, etc.

Since multiple SSIDs are active at the same time, one or more EUDs, for example, EUDs 1-EUDs n ($106_1$-$106_n$), that are located within the coverage area of the AP 102 can detect the multiple SSIDs (e.g., SSID 1-SSIDn) and can select a specific SSID for connection to the user's preferred network ($104_1$-$104_n$). For example, EUD(s) 1 $106_1$ can select SSID 1 to connect to network 1 $104_1$, EUD(s) 2 $106_2$ can select SSID 2 to connect to network 2 $104_2$, EUD(s) n $106_n$ can select SSIDn to connect to network n $104_n$, etc. The AP 102 can receive data from EUDs ($106_1$-$106_n$) and transfer the received data to a routing device 108. In an aspect, the routing device 108 can direct the data received from a EUD to appropriate third party network devices $110_1$-$110_n$ (e.g., gateway devices) based on the SSID selected by the EUD. Moreover, the routing device 108 can establish exit points for the received data to appropriate third party network devices. For example, if SSID 1 is associated with network 1 $104_1$, the routing device 108 can route data received from EUD(s) 1 $106_1$ to network 1 device(s) $110_1$; if SSID 2 is associated with network 2 $104_2$, the routing device 108 can route data received from EUD(s) 2 $106_2$ to network 2 device(s) $110_2$; if SSIDn is associated with network n $104_n$, the routing device 108 can route data received from EUD(s) n $106_n$ to network n device(s) $110_n$; etc. It is noted that the wireless AP 102 can isolate data ascribed to each SSID to avoid and/or mitigate a cross-network security risk. As an example, the wireless AP 102 can establish private circuits with encryption to isolate the data.

As an example, the EUDs 1-EUDs n ($106_1$-$106_n$) can comprise most any electronic communication devices such as, but not limited to, most any consumer electronic device, for example, a tablet computer, a digital media player, a digital photo frame, a digital camera, a cellular phone, a personal computer, a personal digital assistant (PDA), a smart phone, a laptop, a gaming system, set top boxes, home cameras, home security systems, sensors, etc. It is noted that EUDs 1-EUDs n ($106_1$-$106_n$) can be mobile, have limited mobility and/or be stationary.

Routing device 108 can comprise hardware and/or software configured to transmit information between one or more devices or between two or more networks. In some embodiments, routing device 108 can be a network-based router (e.g., virtual router) that can route traffic to/from EUDs 1-EUDs n ($106_1$-$106_n$) to/from networks $104_1$-$104_{Nn}$ (and/or one or more of respective devices $110_1$-$110_n$ associated with networks $104_1$-$104_n$). Although FIG. 1 depicts the routing device 108 as being coupled to the wireless AP 102 via a backhaul network 112, the subject specification is not so limited and the routing device can be part of and/or locally coupled to the wireless AP 102.

In one example, routing device 108 can receive, from AP 102 over the backhaul network 112, information transmitted from EUDs 1 $106_1$ intended for one or more of devices of network 1 $104_1$. The routing device 108 can also receive SSID information related to the SSID 1 selected by the EUDs 1 $106_1$ from the AP 102. Routing device 108 can store and/or access a routing table that can indicate one or more addresses for network 1 devices $110_1$ associated with a network 1 $104_1$ that has been assigned to the SSID 1, that enables the routing device 108 to appropriately forward information incoming to routing device 108 (e.g., from EUDs 1 $106_1$ intended for one or more of network 1 devices $110_1$ and/or from one or more of network 1 devices $110_1$ intended for EUDs 1 $106_1$).

Routing device 108 can be configured to allow routing device 108 to create and/or host many multiple networks, similar to the guest networks feature of current routers. For example, routing device 108 can offer a guest-type network that provides different security settings for different networks and/or different bandwidth or speed allocations for different networks.

System 100 provides Wi-Fi coverage for different services and/or networks through a common AP 102. For example, a common AP deployed within a mall by a service provider can provide coverage for and broadcast multiple SSIDs associated with one or more third party businesses, for example, a coffee shop, a department store, a bookstore, a restaurant, and the like. Moreover, the third party businesses can be allowed to lease, purchase, and/or rent resources of an existing AP 102, for example, based on defined policies.

Thus, the third party businesses can save on installation and/or operational costs associated with deploying APs and backhaul links by leveraging (by leasing, renting, and/or purchasing,) resources of the existing AP 102. Further, since a common AP is utilized to manage and/or control the broadcast of multiple SSIDs, interference that would have otherwise been created by respective APs of the multiple networks can be avoided and accordingly, performance can be improved.

Figure 2:
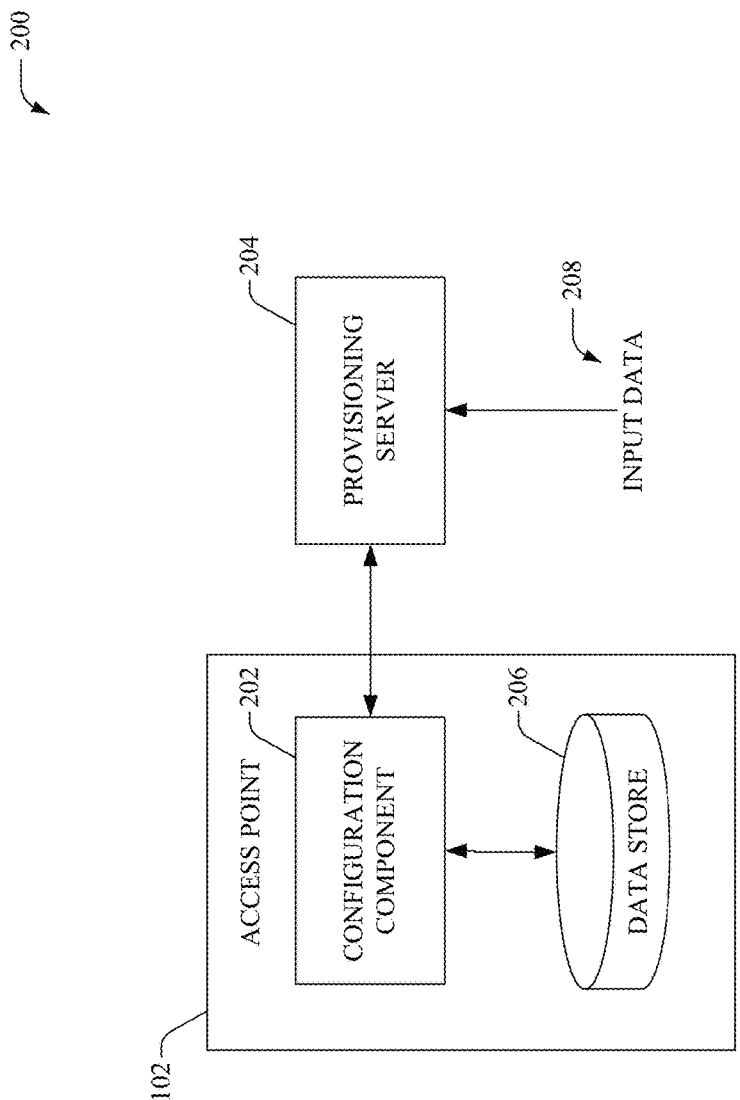
FIG. 2 illustrates an example system for configuration of a WVNO function.

Referring now to FIG. 2, there illustrated is an example system 200 for configuration of a WVNO function, in accordance with an aspect of the subject disclosure. In one aspect, the AP 102 dynamically transmits different SSIDs over the same frequencies to facilitate routing of data associated with different third party networks (e.g., of public or private networks deployed by different service providers) via the common AP 102. It is noted that the AP 102 can comprise functionality as more fully described herein, for example, as described above with regard to system 100.

The AP 102 comprises a configuration component 202 that can receive information for creating the WVNO function from a provisioning server 204. As an example, the information can be stored within data store 206. It is noted that the data store 206 can comprise volatile memory(s) or nonvolatile memory(s), or can comprise both volatile and nonvolatile memory(s). Examples of suitable types of volatile and non-volatile memory are described below with reference to FIG. 10. The memory (e.g., data stores, databases) of the subject systems and methods is intended to comprise, without being limited to, these and any other suitable types of memory.

According to an embodiment, the provisioning server 204 can receive input data, for example, from a network operator (and/or device user), to configure WVNO function settings for AP 102. As an example, the input data 208 can be provided via a web portal accessed via a user device (e.g., smart phone, laptop, tablet, etc.). The input data can comprise, but is not limited to, a unique network name/identifier (e.g., SSID) and parameters associated with a service account related to a third party network. In one aspect, the parameters can comprise security credentials (e.g., password) that are used by EUDs to connect to the network on selecting the SSID. Further, the parameters can comprise routing information that specifies addressing/identifying information of devices to which data (e.g., that are transmitted to AP 102 and/or the routing device 108), received from a EUD connected to the AP 102 via the SSID, is to be transmitted. Furthermore, the parameters can comprise timing information that defines a time period during which the SSID is to be broadcasted (e.g., a specified date range, until a specified amount of time has elapsed, until a specified amount of bandwidth has been utilized, etc.).

Additionally or optionally, the parameters can comprise resource allocation information that defines a bandwidth assigned to traffic associated with the SSID. In one example, the resource allocation information can be dynamically updated based on an operator-defined policy. In some embodiments, the provisioning server 204 can provision different amounts of speed for the different networks. The speed provisioned can also be part of the quality of service provided/guaranteed. In some embodiments, the provisioning server 204 (or any other device in system) can provision an amount of bandwidth for the networks and/or based on the one or more devices associated with the networks. The amount of bandwidth can be a fixed amount of bandwidth in some embodiments. The amount of bandwidth can be a guaranteed amount of bandwidth to provide a defined quality of service in some embodiments. In other embodiments, the guaranteed amount of bandwidth can be a maximum amount of bandwidth. In either case, whether the amount of bandwidth is a guaranteed minimum amount of bandwidth or a maximum amount of bandwidth, the amount of bandwidth provisioned can be based on the functionality of a particular EUD, for example, in some embodiments. In yet another embodiment, the bandwidth can be dynamically changed, for example, based on a time, day, event, and/or most any defined policy.

Further, the amount of bandwidth that can be provisioned can be provisioned equally for incoming traffic and for outgoing traffic in some embodiments. For example, a digital video recorder that is provisioned 8 Mbytes/s can have 4 Mbytes/s of bandwidth provisioned for incoming traffic and 4 Mbytes/s provisioned for outgoing traffic. In some embodiments, the incoming and outgoing bandwidth can be provisioned in an asymmetric manner. For example, the device can be provisioned to have more bandwidth on the incoming link for devices that have an extensive amount of data transmitted to the device (and much less data transmitted from the device).

In some embodiments, in lieu of provisioning bandwidth based on the one or more EUDs, provisioning server 204 can establish a class of service for a specific network. For example, a maximum bandwidth (e.g., maximum amount of instantaneous bandwidth) can be provisioned for all EUDs associated with a specific SSID. In some embodiments, the provisioning server 204 can instruct the AP 102 to dynamically adjust the maximum amount of bandwidth associated with a specific SSID based on detection of whether there may not be enough bandwidth to meet the requests of the EUDs.

Provisioning server 204 can comprise hardware, software or a combination of hardware and software configured to instruct the AP 102 to broadcast additional SSIDs linked to corresponding third party networks. In one aspect, the provisioning server 204 can also instruct the AP 102 to establish private circuits with the encryption to isolate traffic associated with the different SSIDs and can further instruct a routing device 108 (and/or the AP 102) to establish exit points for the traffic associated with the third party networks. The instructions can be transmitted at most any time, for example, during setup and/or initialization of the AP 102, when the AP 102 is idle, periodically, at a specified time, in response to an event, on-demand, etc.

Figure 3:
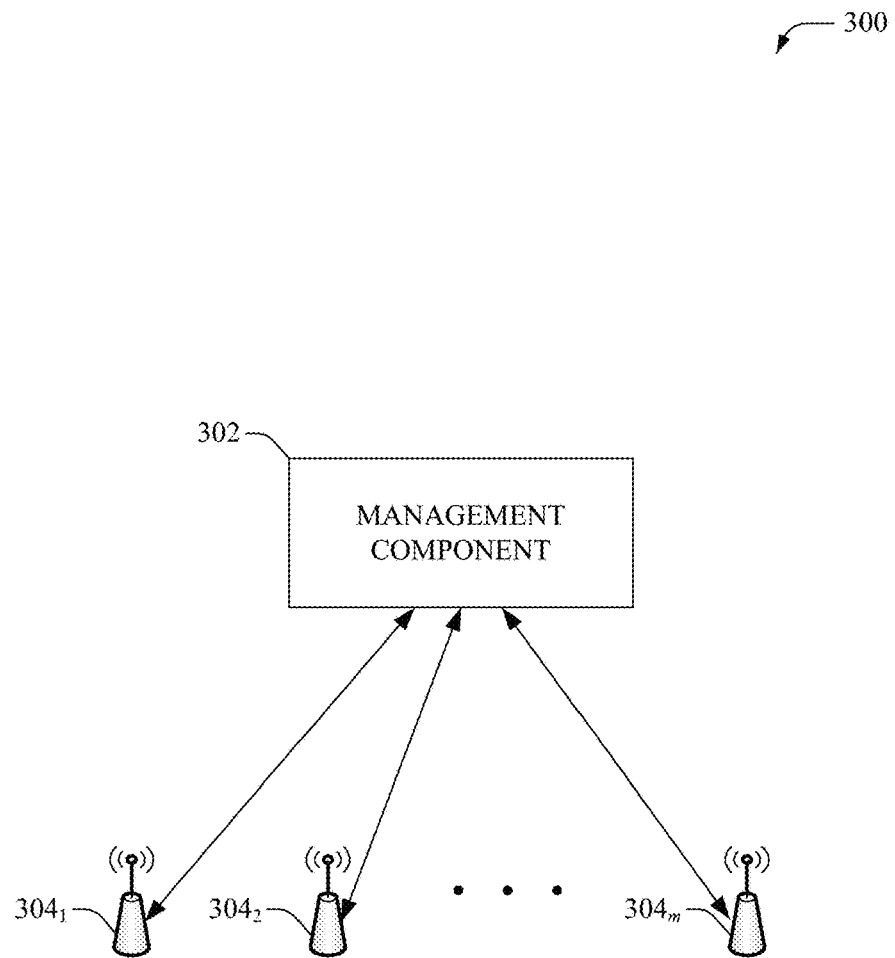
FIG. 3 illustrates an example system for controlling access point (AP) devices deployed within an area.

FIG. 3 there illustrated is an example system 300 for controlling AP devices deployed within an area, in accordance with an aspect of the subject disclosure. System 300 comprises a management component 302 that coordinates operations of APs, such as APs $304_1$-$304_M$ (where M is most any natural number greater than 1). In an aspect, the APs $304_1$-$304_M$ can be substantially similar to AP 102 and can comprise functionality as more fully described herein, for example, as described above with regard to AP 102.

In one example, the APs $304_1$-$304_M$ can comprise wireless local area network (WLAN) and/or Wi-Fi APs deployed by a common service provider/network carrier. The APs $304_1$-$304_M$ can broadcast two or more SSIDs over the same frequencies to create a WVNO function that provides third party networks to utilize (e.g., lease) resources of the common service provider/network carrier as explained in detail with respect to system 100. Reuse of common infrastructure (network and APs) saves on deployment and/or maintenance costs. Further, since the common AP controls the broadcast of the multiple SSIDs, interference that would have been generated due to frequency re-use by multiple APs of the different third party network, is avoided. This provides improved network coverage resulting in an improved end user experience.

In an embodiment, the management component 302 can determine AP devices, such as, APs $304_1$-$304_M$, that are located in close proximity with each other (e.g., deployed within a defined distance from each other) and can tune parameters of the APs $304_1$-$304_M$ to reduce radio signal interference. Radio signal interference can comprise the presence of interfering radio signals, for example, from neighboring APs, that disrupts normal WLAN operations. With the growing proliferation of wireless networks, a large number of WLAN APs can be deployed close to each other, for example, having at least partially overlapping coverage areas. As an example, radio signal interference can occur when the WLAN APs within range of each other transmit over the same radio frequency (RF) channels. The management component 302 can tune radio signal transmission parameters of one or more of the APs $304_1$-$304_M$, such as, but not limited to, by optimizing the RF channel frequency, by collaborating on the RF channel frequency for handoffs, etc., to reduce interference between the APs $304_1$-$304_M$.

Figure 4:
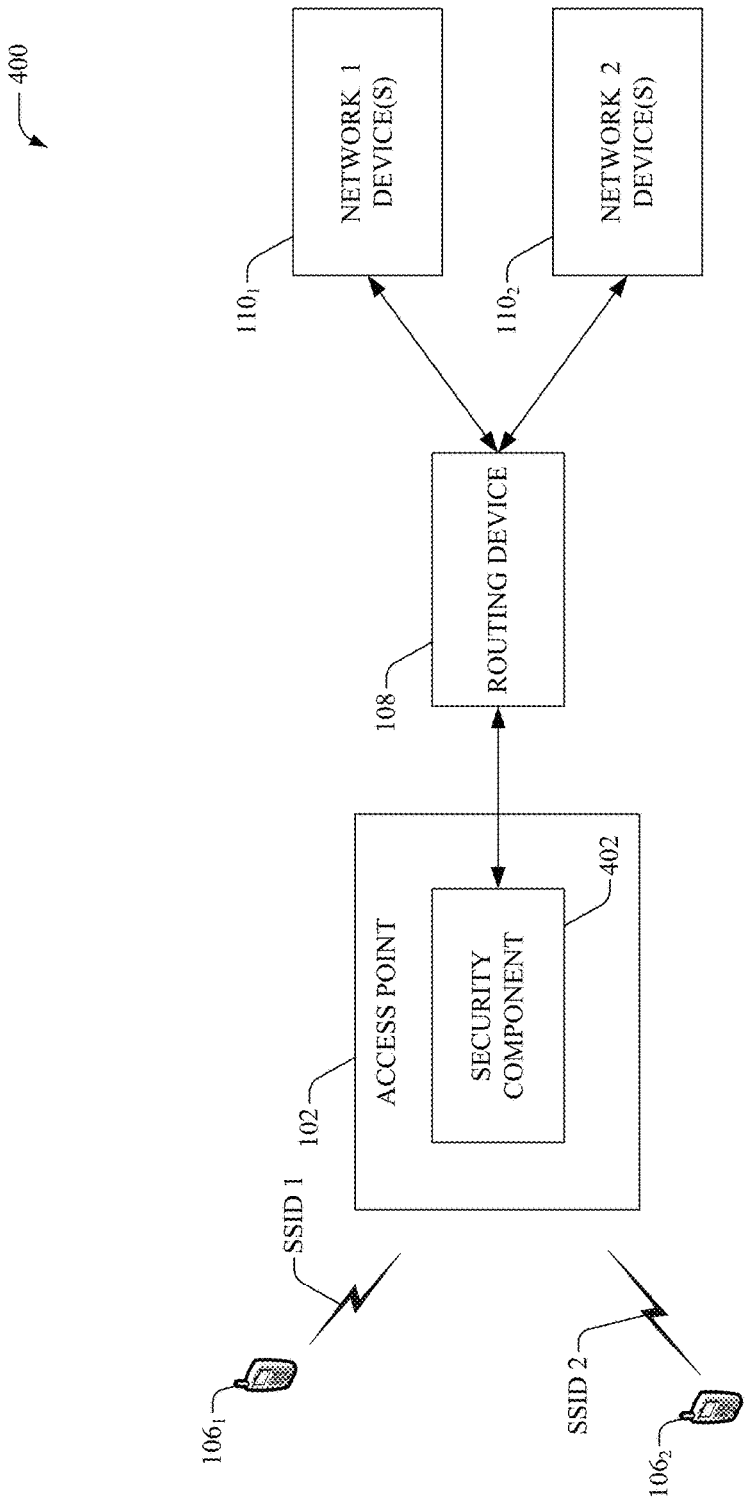
FIG. 4 illustrates an example system for partitioning data associated with different WVNO functions.

Referring now to FIG. 4, there illustrated is an example system 400 for partitioning data associated with different WVNO functions, according to an aspect of the subject disclosure. It is noted that the AP 102, EUDs $106_1$-$106_2$, routing device 108, network 1 devices $110_1$, and network 2 devices $110_2$ can comprise functionality as more fully described herein, for example, as described above with regard to systems 100-200.

In one aspect, a security component 402 can be utilized to isolate traffic associated with different SSIDs and/or traffic directed to different networks. The security component 402 can partition data associated with respective SSIDs, for example, by utilizing a virtual private network (VPN) or logical provisioning circuit. As an example, EUD $106_1$ can select SSID 1 while coupling to the AP 102. Accordingly, data from the EUD $106_1$ can be routed to a device of a network that is linked to SSID 1, for example, network 1 devices $110_1$. Further, EUD $106_2$ can select SSID 2 while coupling to the AP 102. Accordingly, data from the EUD $106_2$ can be routed to a device of a network that is linked to SSID 2, for example, network 2 devices $110_2$. In this example scenario, the security component 402 can partition the data received from EUD $106_1$ and EUD $106_2$, and prohibit EUD $106_1$ from accessing network 2 devices $110_2$ and/or EUD $106_2$ from accessing network 1 devices $110_1$. In some embodiments, private networks can leverage the features provided by the security component 402. For example, a company can extend their corporate/private Wi-Fi network onto AP 102 and the security component 402 can ensure that traffic to and/or from the private network devices would be isolated from non-authorized EUDs (e.g., EUDs that have not selected and authenticated to an SSID assigned to the private network) attached to the AP 102.

Figure 5:
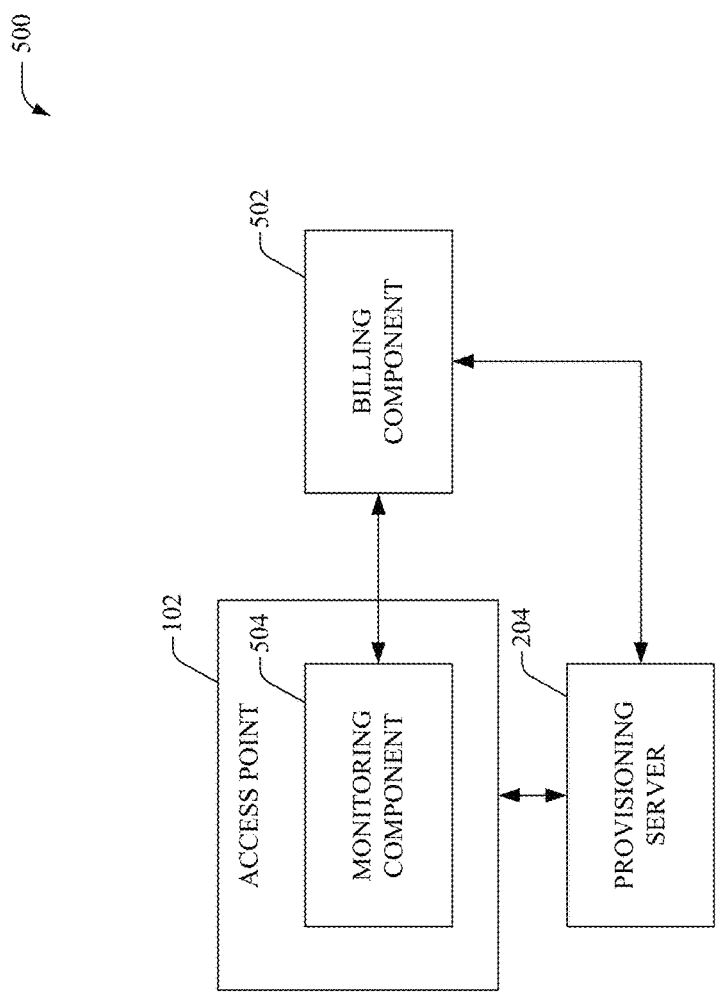
FIG. 5 illustrates an example system that facilitates billing for WVNO functions.

FIG. 5 illustrates an example system 500 that facilitates billing for WVNO functions, according to aspects of the disclosed subject matter. WVNO is a carrier-class offering to better optimize and monetize an existing Wi-Fi/network infrastructure. As an example, a service provider (e.g., third party businesses) can be a potential client for this service in locations where physical infrastructure of the network provider has not been deployed. Additionally or alternatively, a network provider can offer the service to other network providers in locations where it has existing infrastructure and the service provider does not. It is noted that although WVNOs are discussed herein with respect to service providers, the WVNO can be offered to and/or utilized by most any entities, such as, but not limited to, end users (e.g., personal networks and/or small business), and/or larger corporations (e.g., chains). In one embodiment, a billing component 502 can be utilized to implement one or more billing schemes to monetize the WVNO service. It is noted that the AP 102 and provisioning server 204 can comprise functionality as more fully described herein, for example, as described above with regard to systems 100-200 and 400.

To provide and/or extend Wi-Fi coverage, each service provider has to purchase and deploy the infrastructure (e.g., backhaul, APs) and/or subscribe to network access (e.g. Internet access provided by a network provider). The costs and time associated with deploying the infrastructure can be significant. Further, oftentimes the infrastructure can be underutilized or completely unused, for example, during periods of low traffic or inactivity. Thus, AP 102 can create WVNOs that offer the service providers the opportunity to stand up public or private Wi-Fi networks with the existing infrastructure deployed by the network provider. Typically, dynamic public and/or private hotspots can be provisioned (e.g., by the provisioning server 204) that can be useful for transient infrastructure. For example, time and/or location dependent networks can be dynamically provisioned (e.g., by the provisioning server 204) at specific times and/or at specific locations (e.g., during sporting events, concerts, meetings, etc.). Additionally or alternatively, private networks such as transient networks (e.g., seasonal stores, marketing locations, etc.) can be offered as an on-demand service (e.g., provisioned when requested via a EUD).

Referring back to FIG. 5, the billing component 502 can implement various billing schemes to charge fees for resource utilization. In one example, the billing scheme can comprise a flat rate. In another example, the billing component 502 can determine a fee based on a time period, bandwidth, and/or location for which the WVNO service has been provisioned (e.g., by the provisioning server 204). In yet another example, the billing component 502 can determine a fee based data usage that can be measured by a monitoring component 504. As an example, the data usage can represent bandwidth utilized by one or more EUDs that connect to the AP 102 using a specific SSID. In some embodiments, the data usage can be pushed to and/or pulled by the billing component 502, for example, periodically, at specific times, in response to an event, etc. It is noted that the subject specification is not limited to the above mentioned billing schemes and most any billing scheme can be utilized to determine a fee associated with the WVNO service. In one aspect, the billing component 502 can aggregate the fee data and provide a billing reports to the user and/or service providers, for example, periodically.

Figure 6:
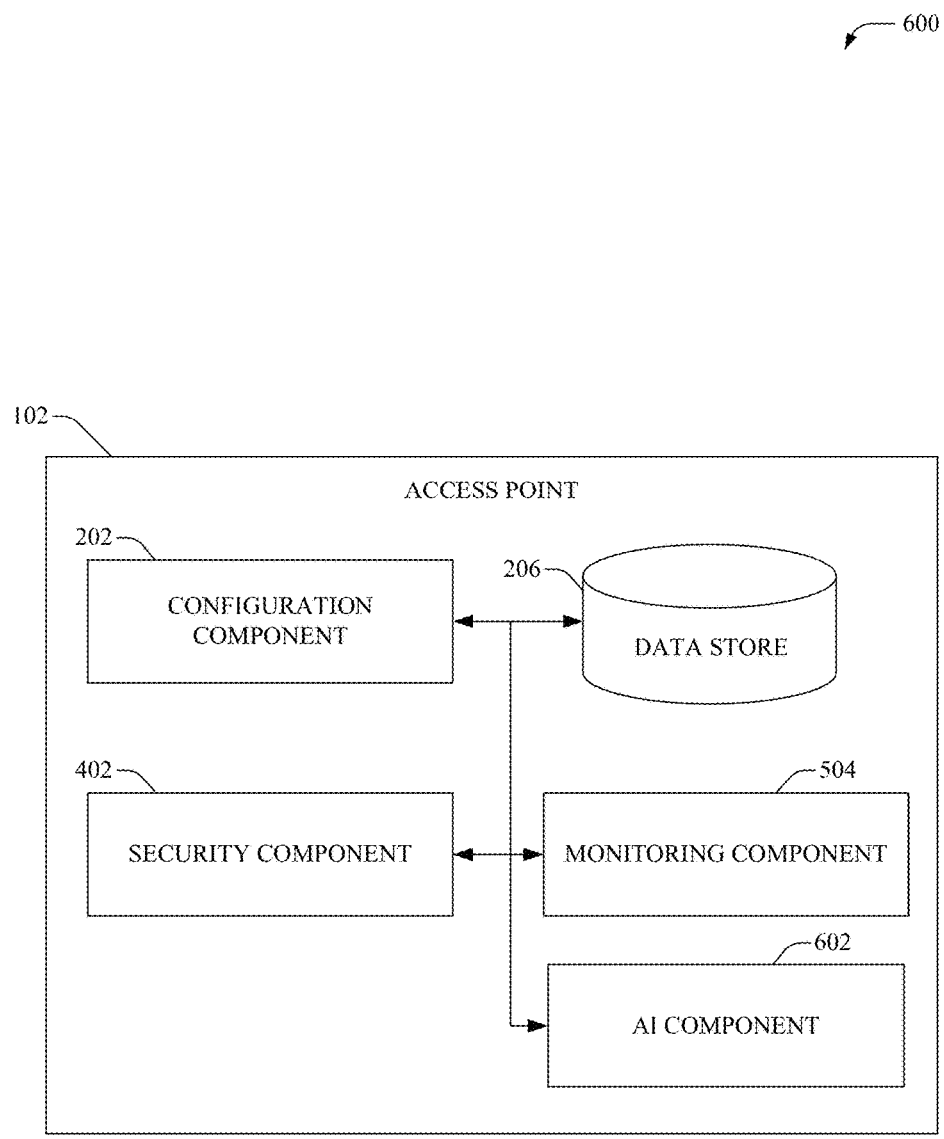
FIG. 6 illustrates an example system that facilitates automating one or more features in accordance with the subject embodiments.

Referring now to FIG. 6, there illustrated is an example system 600 that employs an artificial intelligence (AI) component (602) to facilitate automating one or more features in accordance with the subject embodiments. It can be noted that the AP 102, configuration component 202, data store 206, security component 402, and monitoring component 504 can comprise functionality as more fully described herein, for example, as described above with regard to systems 100-200 and 400-500.

In an example embodiment, system 600 (e.g., in connection with automatically determining when to broadcast an SSID) can employ various AI-based schemes (e.g., intelligent processing/analysis, machine learning, etc.) for carrying out various aspects thereof. For example, a process for determining when and/or for how long a particular SSID can be broadcasted can be facilitated via an automatic classifier system implemented by AI component 602. Moreover, the AI component 602 can various exploit artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, AI component 602 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 602 can be used to automatically learn and perform a number of functions, comprising determining according to a predetermined criteria, selection and/or broadcast of SSIDs, dynamic allocation of bandwidth to the SSIDs, etc. The criteria can include, but is not limited to, historical patterns and/or trends, usage data, traffic patterns, service provider preferences and/or policies, event data, bandwidth data, resource availability data, current time/date, and the like.

According to an embodiment, the network architecture disclosed herein provides several non-limiting advantages and features such as, but not limited to, (i) providing a new class of service to be offered; (ii) selling opportunities to end users, businesses and/or network providers; (iii) better end user experience; (iv) using common infrastructure with appropriately allocated frequencies to avoid contention and interference; (v) better network coverage; (vi) efficient utilization of otherwise unused bandwidth and APs; etc.

Figure 7:
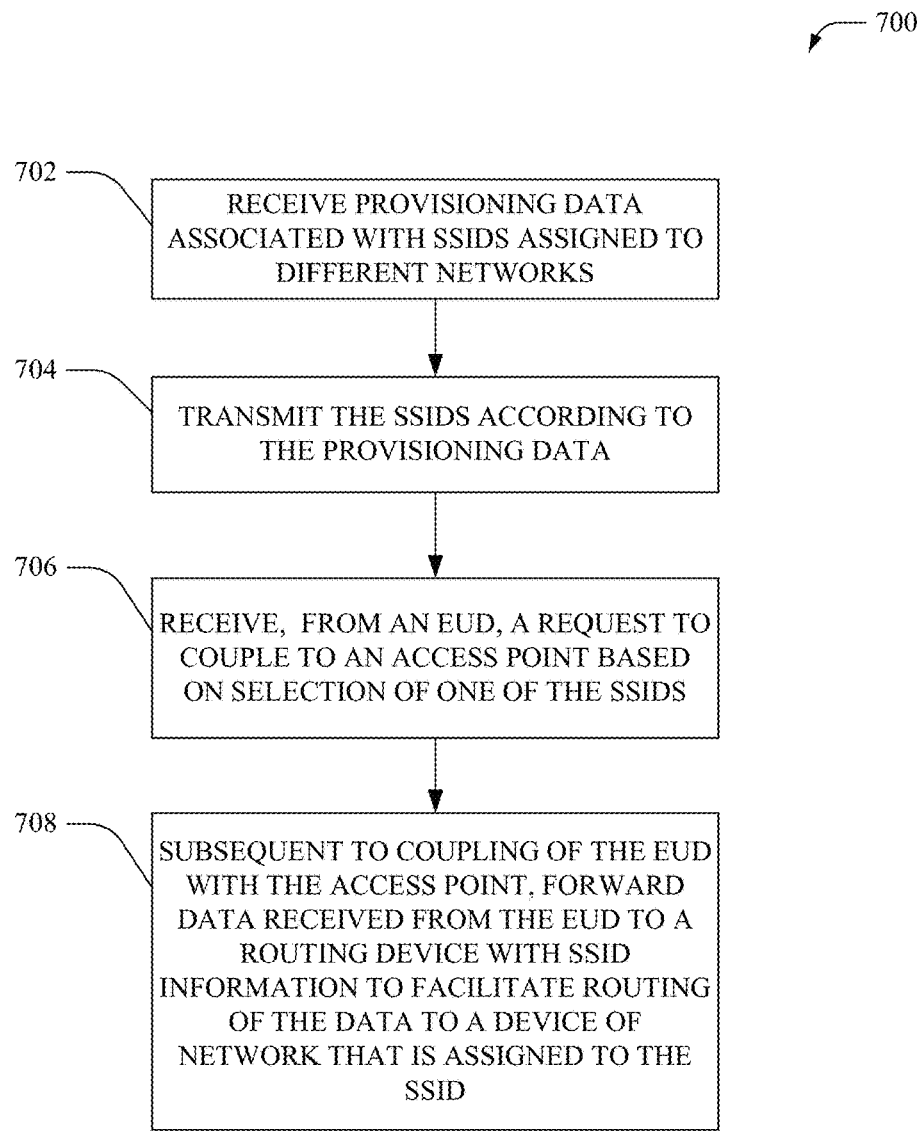
FIG. 7 illustrates an example method that facilitates offering resources of an AP to one or more third party service providers.
Figure 8:
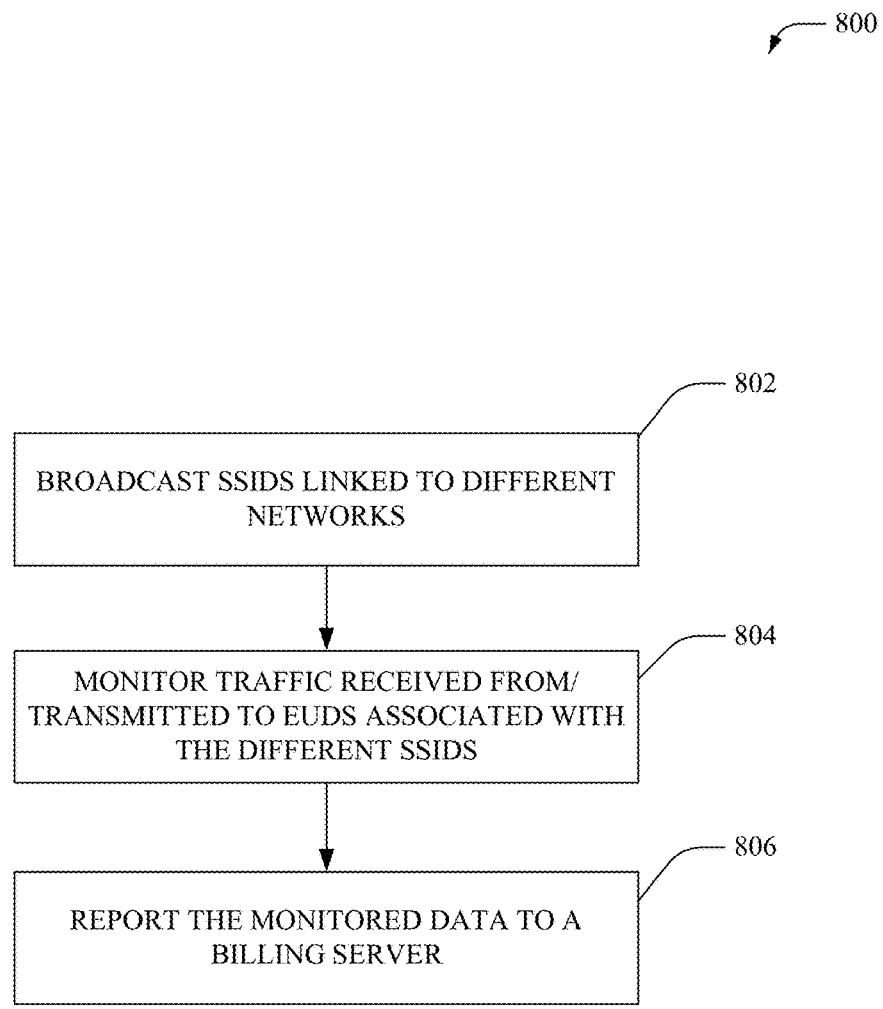
FIG. 8 illustrates an example method that facilitates billing for WVNO functions.

FIGS. 7-8 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7 there illustrated is an example method 700 that facilitates offering resources of an AP to one or more third party service providers, according to an aspect of the subject disclosure. In an aspect, method 700 can be implemented by one or more AP devices (e.g., AP 102) of a communication network (e.g., Wi-Fi network). At 702, provisioning data associated with SSIDs that are assigned to different third party networks can be received. As an example, the provisioning data can comprise information associated with SSIDs that are to be broadcasted including, but not limited to, SSID, time period for which the SSID is to be broadcasted, credentials associated with the SSID, etc. At 704, the SSIDs can be transmitted simultaneously (or substantially simultaneously) over the same frequencies in accordance with to the provisioning data.

Further, at 706, a request to couple to an AP can be received from a EUD based on a selection of one of the SSIDs. For example, the EUD can select a SSID associated with a user's preferred network during (or as part of) a connection to the AP. At 708, subsequent to the coupling of the EUD with the AP, data received from the EUD can be forwarded to a routing device along with the SSID information to facilitate routing of the data to a device of a network assigned to the SSID. The data received from EUDs that have selected different SSIDs can be isolated to prevent a cross-network security risk.

FIG. 8 illustrates an example method 800 that facilitates billing for WVNO functions, according to an aspect of the subject disclosure. As an example, method 800 can be implemented by one or more RAN devices (e.g., AP 102) of a communication network (e.g., Wi-Fi network). At 802, SSIDs linked to different networks (e.g., service providers) can be broadcast, for example, via an AP device. As an example, the SSIDs can be linked to the networks based on input data received by a provisioning server. EUDs within the coverage area of the AP can couple to the AP by selecting one of the SSIDs. Communications to/from a first EUD that has selected a first SSID can be isolated from communications to/from a second EUD that has selected a second SSID. At 804, the traffic (e.g., communication data) received from/transmitted to the EUDs associated with the different SSIDs can be monitored. Further, at 806, the monitored data can be reported to a billing server, for example, periodically, on-demand, in response to an event, etc. As an example, the billing server can aggregate data from one or more APs and generate a bill corresponding to each SSID.

Figure 9:
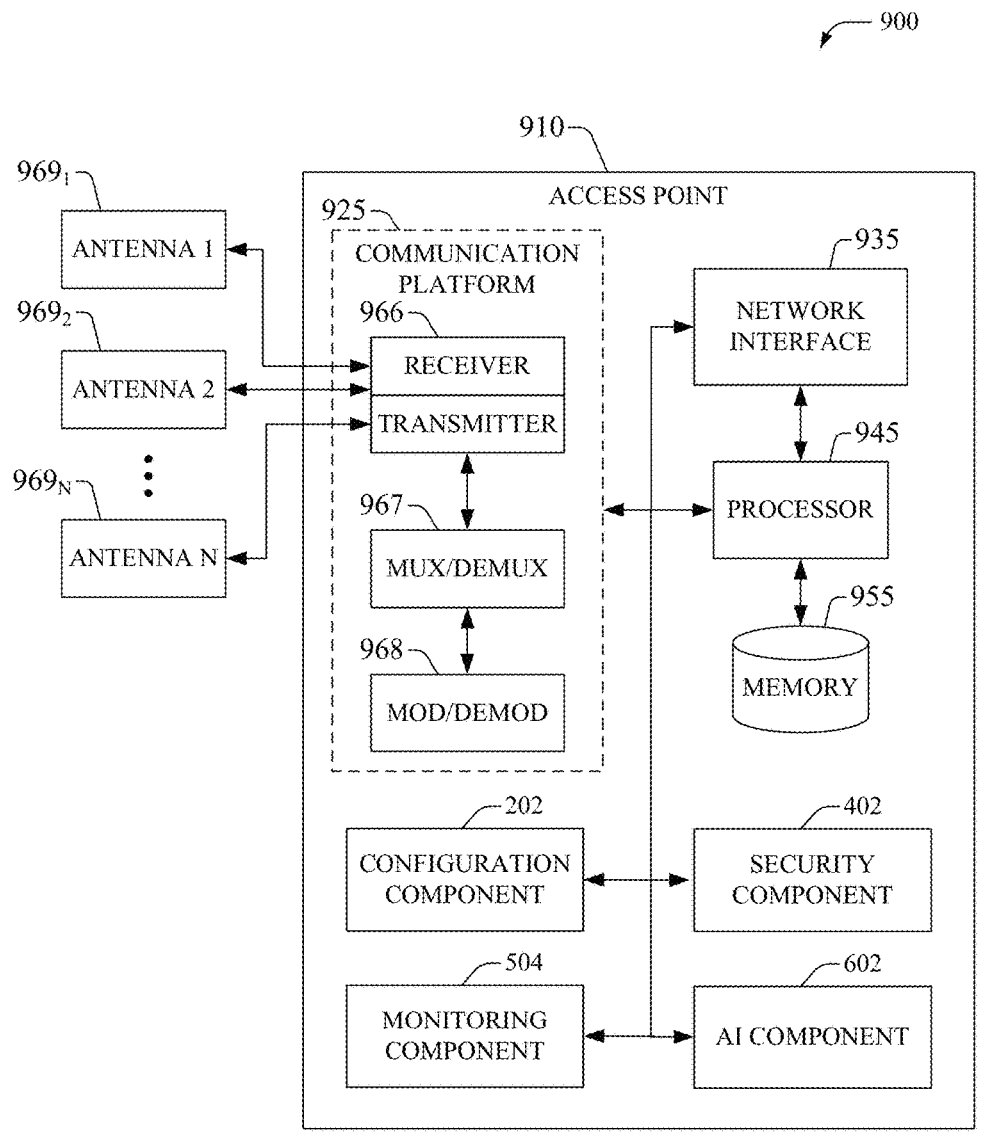
FIG. 9 illustrates an example embodiment of an AP that can provide WVNO functions.

With respect to FIG. 9, in example embodiment 900, AP 910 can receive and transmit signal(s) (e.g., traffic and control signals) from and to wireless devices, access terminals, wireless ports and routers, etc., through a set of antennas $969_1$-$969_N$. It should be appreciated that while antennas $969_1$-$969_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 comprises a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

AP 910 also comprises a processor 945 configured to confer functionality, at least partially, to substantially any electronic component in the AP 910, in accordance with aspects of the subject disclosure. In particular, processor 945 can facilitate AP 910 to implement configuration instructions received through communication platform 925, which can comprise storing data in memory 955. In addition, processor 945 facilitates AP 910 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 945 can manipulate antennas $969_1$-$969_N$ to facilitate beamforming or selective radiation pattern formation, which can benefit specific locations (e.g., store, conference room, food court, etc.) covered by AP; and exploit substantially any other advantages associated with smart-antenna technology. Memory 955 can store data structures, code instructions, system or device information, and specification such as multimode capabilities; code sequences for scrambling; spreading and pilot transmission, floor plan configuration, AP deployment and frequency plans; and so on. Moreover, memory 955 can store configuration information such as schedules and policies; AP address(es) or geographical indicator(s); access lists (e.g., white lists); SSID information received from a provisioning server, and so forth. In addition, data store 206 can comprise memory 955 that stores configuration information.

In embodiment 900, processor 945 is coupled to the memory 955 in order to store and retrieve information used to operate and/or confer functionality to communication platform 925, broadband network interface 935 (e.g., a broadband modem), and other operational components (e.g., multimode chipset(s), power supply sources . . . ; not shown) that support the AP 910. In one embodiment, the AP 910 can further comprise the configuration component 202, the security component 402, the monitoring component 504, and/or the AI component 602, which can comprise functionality, as more fully described herein, for example, with regard to systems 100-600. In addition, it is to be noted that the various aspects disclosed in the subject specification can also be implemented through (i) program modules stored in a computer-readable storage medium or memory (e.g., memory 955) and executed by a processor (e.g., processor 945), or (ii) other combination(s) of hardware and software, or hardware and firmware. AP 102 and/or APs $304_1$-$304_M$, can be substantially similar to, and can comprise at least a portion of the functionality described with reference to, AP 910.

Figure 10:
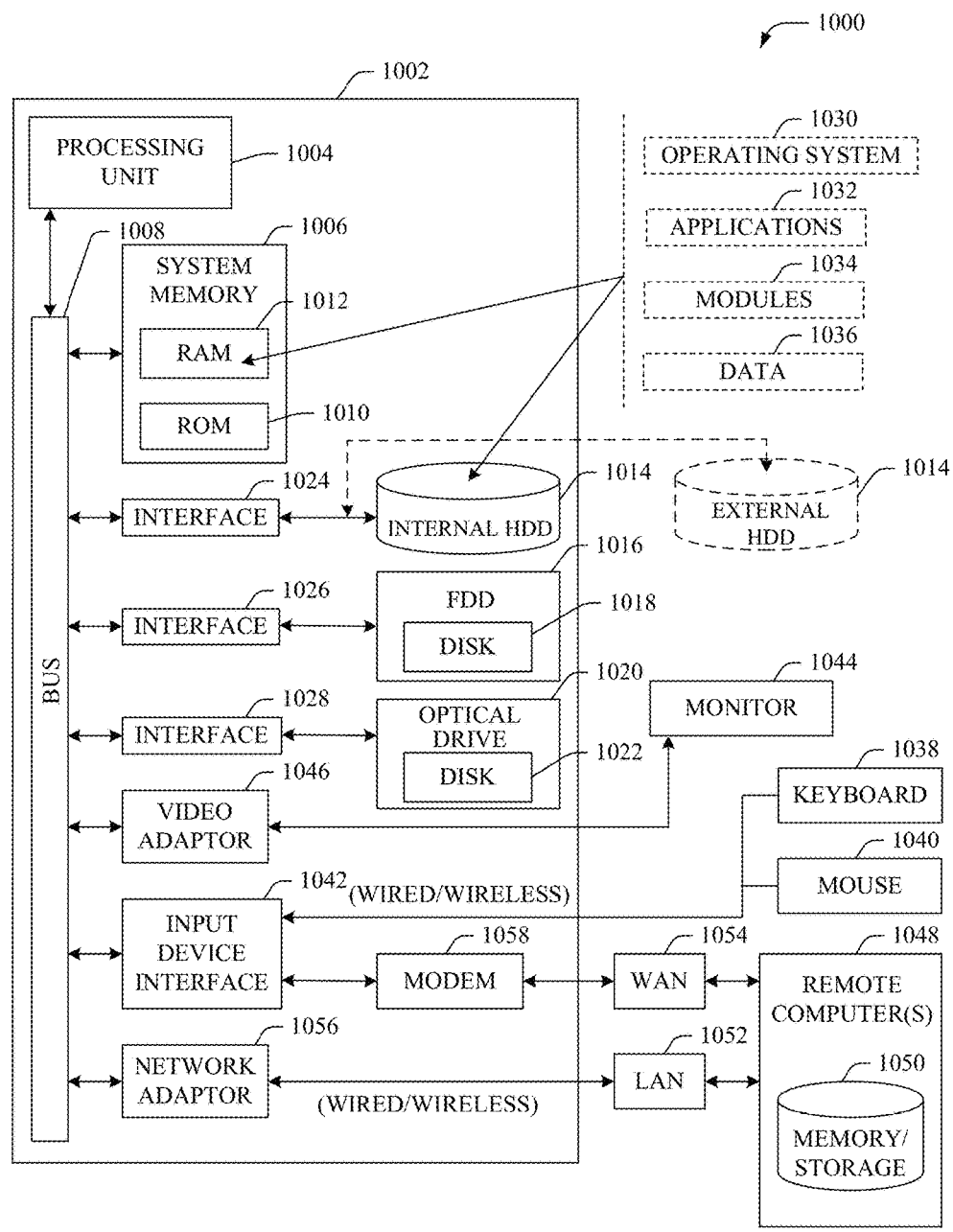
FIG. 10 illustrates a block diagram of a computer operable to execute the disclosed communication architecture.

Referring now to FIG. 10, there is illustrated a block diagram of a computer 1002 operable to execute the disclosed communication architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment 1000 for implementing various aspects of the specification comprises a computer 1002, the computer 1002 comprising a processing unit 1004, a system memory 1006 and a system bus 1008. As an example, the component(s), application(s) server(s), equipment, system(s), interface(s), gateway(s), controller(s), node(s) and/or device(s) (e.g., AP 102, EUD(s) 1-N ($106_1$-$106_n$), network 1 device(s)-network n device(s) $110_1$-$110_n$, routing device 108, configuration component 202, provisioning server 204, data store 206, management component 302, APs $304_1$-$304_M$, security component 402, billing component 502, monitoring component 504, AI component 602, AP 910, etc.) disclosed herein with respect to systems 100-600 and 900 can each comprise at least a portion of the computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also comprise a wireless AP disposed thereon for communicating with the wireless adapter 1056.

When used in a WAN networking environment, the computer 1002 can comprise a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This includes at least Wi-Fi and Bluetooth™ wireless technologies or other communication technologies. Thus, the communication can be a predefined structure as with a conventional network or simply an ad hoc communication between at least two devices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   receiving, by an access point device comprising a processor, timing data from a provisioning server, of a first network associated with a network provider identity, wherein the network provider identity facilitates deployment of the access point device, wherein the timing data is indicative of a timing criterion that defines an operating interval during which a virtual network operator function is to be operated, and wherein the operating interval has been determined based on event data associated within an event at a geographical location served by the access point device;
   in response to determining that the timing criterion is satisfied, facilitating, by the access point device, a transmission of identifier data comprising first identifier data and second identifier data over common frequencies, wherein the first identifier data is indicative of the first network and the second identifier data is indicative of a second network associated with a third-party service provider identity, wherein the determining that the timing criterion is satisfied comprises verifying that an amount of bandwidth, defined within the timing data, has not been utilized and verifying that the operating interval has not expired;
   facilitating, by the access point device, a first routing of first communication data to a first network device of the first network, wherein the first communication data is received from a first end user device that selects the first identifier data during a first coupling of the first end user device and the access point device; and
   facilitating, by the access point device, a second routing of second communication data to a second network device of the second network, wherein the second communication data is received from a second end user device that selects the second identifier data during a second coupling of the second end user device and the access point device.

2. The method of claim 1, wherein the facilitating the transmission comprises facilitating the transmission of information indicative of a first service set identifier linked to the first network and a second service set identifier linked to the second network.

3. The method of claim 1, wherein the facilitating the transmission comprises facilitating the transmission by employing a Wi-Fi protocol.

4. The method of claim 1, further comprising:
   receiving, by the access point device, instruction data from the provisioning server, wherein the instruction data is employable to allocate resources to the second communication data.

5. The method of claim 4, further comprising:
   based on policy data defined by the network provider identity, updating, by the access point device, the instruction data.

6. The method of claim 1, further comprising:
   isolating, by the access point device, the first communication data from the second communication data.

7. The method of claim 6, wherein the isolating comprises prohibiting the second end user device access to the first network device.

8. The method of claim 1, further comprising:
   monitoring, by the access point device, a utilization of resources associated with the second communication data.

9. The method of claim 8, further comprising:
   based on the monitoring, determining, by the access point device, usage data associated with the second communication data; and
   directing, by the access point device, the usage data to a billing server device that facilitates determination of a fee associated with the second communication data.

10. An access point device, comprising:
    a processor; and a memory that stores executable instructions that, when executed by the processor, facilitate performance of operations, comprising:

receiving, from a provisioning server of a first communication network that deploys the access point device, information indicative of a timing criterion that specifies an operating time period during which a virtual network operator function is to be implemented, wherein the operating time period has been determined based on event data associated within an event at a geographical location served by the access point device;

in response to determining that the timing criterion is satisfied, broadcasting, via common frequencies, identifier data comprising a first identifier of the first communication network and a second identifier of a third-party service provider, wherein the determining that the timing criterion is satisfied comprises verifying that an amount of bandwidth, defined within the information, has not been utilized and verifying that the operating time period has not expired;

subsequent to receiving first communication data from a first end user device that has coupled with the access point device by employing the first identifier, directing the first communication data to a routing device that is employable to route the first communication data to a first network device of the first communication network; and subsequent to receiving second communication data from a second end user device that has coupled with the access point device by employing the second identifier, directing the second communication data to the routing device that is employable to route the second communication data to a second network device of a second communication network deployed by the third-party service provider.

11. The access point device of claim 10, wherein the first identifier comprises a service set identifier.

12. The access point device of claim 10, wherein the broadcasting is based on provisioning data received from the provisioning server.

13. The access point device of claim 12, wherein the provisioning data comprises data indicative of a number of end user device associations that are allowed to utilize the second identifier.

14. The access point device of claim 12, wherein the provisioning data comprises resource allocation data indicative of first resources that are to be allocated to a first communication associated with the first identifier.

15. The access point device of claim 12, wherein the provisioning data comprises credential data indicative of a credential employable to authenticate a coupling of the first end user device with the access point device.

16. The access point device of claim 10, comprising a Wi-Fi access point device.

17. A non-transitory machine-readable storage medium, comprising executable instructions that, when executed by a processor of an access point device deployed by a network provider, facilitate performance of operations, comprising:

receiving, from a provisioning server of a first network associated with the network provider, information indicative of a timing criterion indicative of an operating time period during which a virtual network operator function is to be implemented, wherein the operating time period has been determined based on event data associated within an event at a geographical location served by the access point device;

in response to determining that the timing criterion is satisfied, facilitating a transmission of identifier data comprising a first identifier assigned to the first network and a second identifier assigned to a second network deployed by a third-party service provider, wherein the facilitating comprises facilitating the transmission over common frequencies, wherein the determining that the timing criterion is satisfied comprises verifying that an amount of bandwidth, defined within the information, has not been utilized and verifying that the operating time period has not expired;

receiving first communication data from a first end user device that employs the first identifier for coupling to the access point device and second communication data from a second end user device that employs the second identifier for coupling to the access point device;

based on the first identifier, facilitating a first routing of the first communication data to a first network device of the first network; and based on the second identifier, facilitating a second routing of the second communication data to a second network device of the second network.

18. The non-transitory machine-readable storage medium of claim 17, wherein the operations further comprise:

in response to determining that the timing criterion is not satisfied, prohibiting a broadcast of the second identifier.

19. The non-transitory machine-readable storage medium of claim 17, wherein the facilitating the transmission comprises facilitating the transmission by employing a Wi-Fi protocol.

20. The non-transitory machine-readable storage medium of claim 17, wherein the first identifier comprises a service set identifier.

* * * * *